Feb. 27, 1945.  W. R. BECK  2,370,441
SHUTTLE CAR
Filed Sept. 30, 1943   3 Sheets-Sheet 1
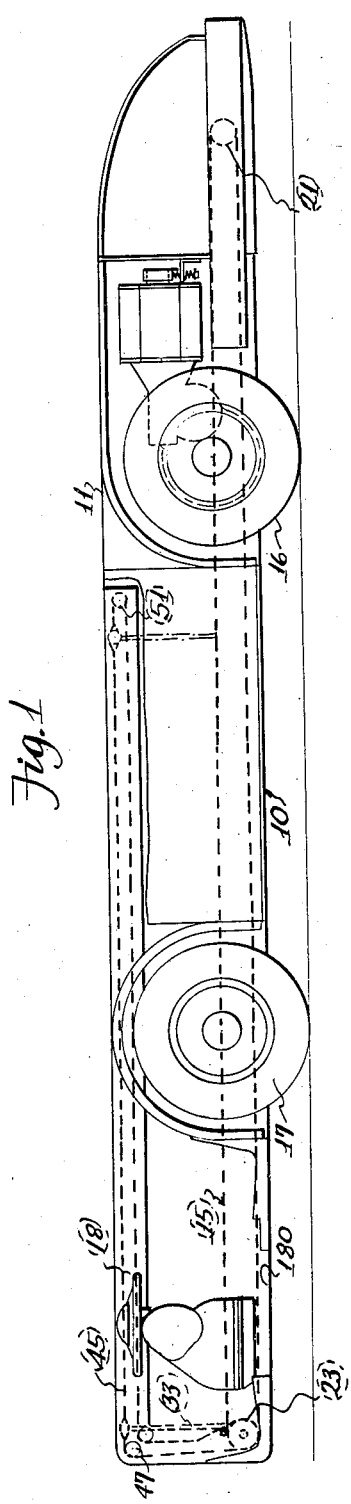
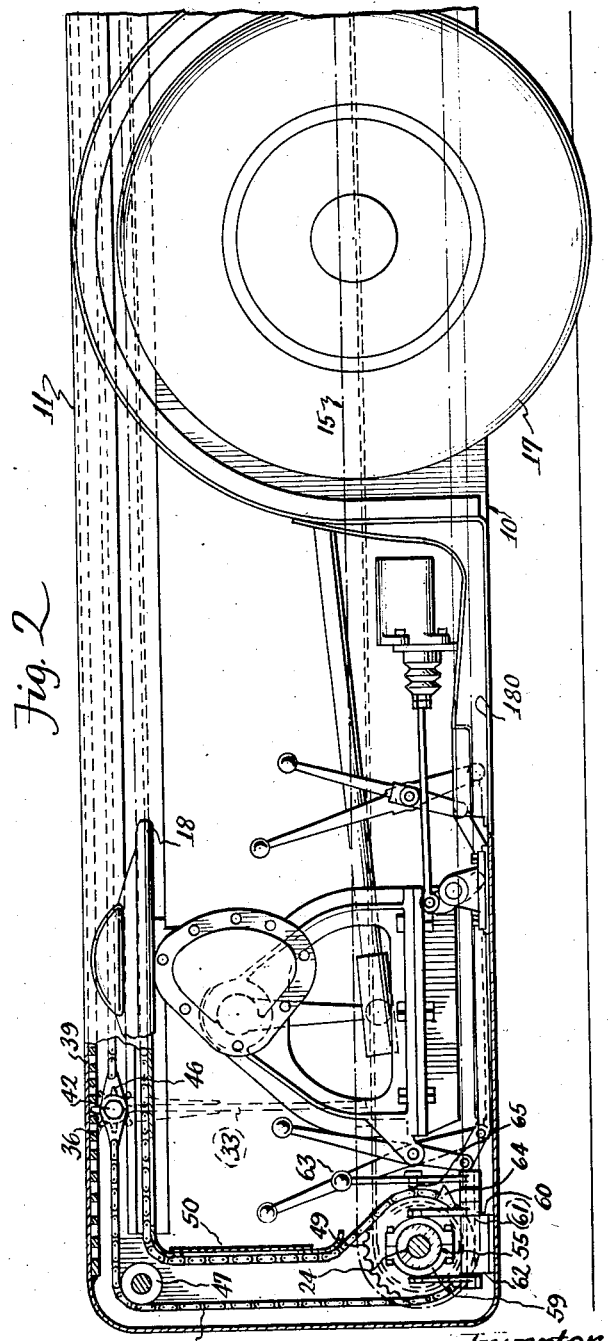
Inventor
William R. Beck
Clarence F. Poole
Attorney Feb. 27, 1945.  W. R. BECK  2,370,441
SHUTTLE CAR
Filed Sept. 30, 1943  3 Sheets-Sheet 2

Inventor
William R Beck
Clarence F. Poole
Attorney

Feb. 27, 1945.  W. R. BECK  2,370,441
SHUTTLE CAR
Filed Sept. 30, 1943  3 Sheets-Sheet 3
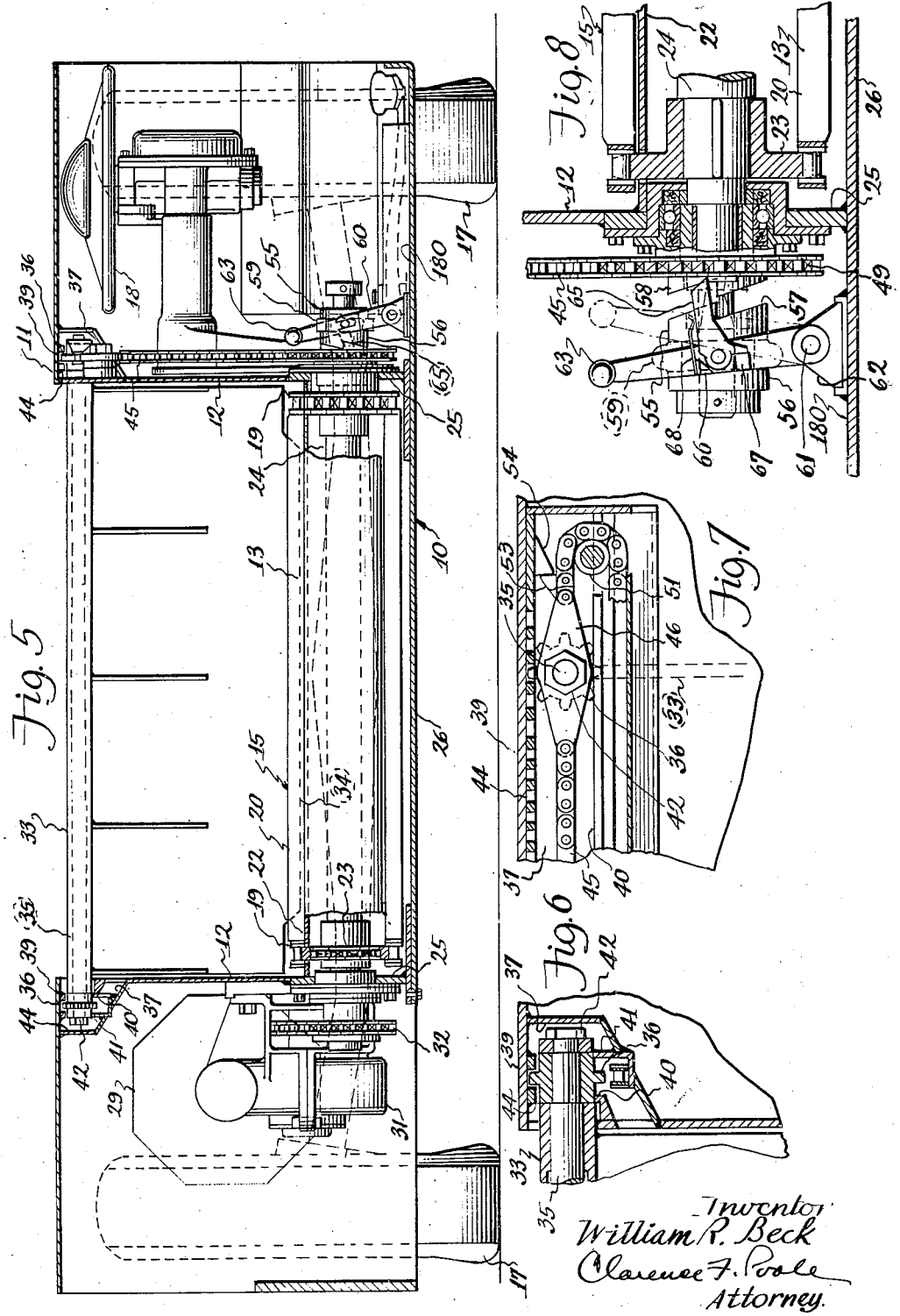

Patented Feb. 27, 1945

2,370,441

UNITED STATES PATENT OFFICE 2,370,441

SHUTTLE CAR

William R. Beck, Chicago, Ill., assignor to Goodman Manufacturing Company, Chicago, Ill., a corporation of Illinois Application September 30, 1943, Serial No. 504,357

13 Claims. (Cl. 214—83)

This invention relates to improvements in shuttle cars adapted to transport coal or other materials from the working places of mines underground.

Shuttle cars operating in mines underground are usually loaded by the loading boom of a face loading machine by extending the loading boom directly into the receiving end of the car. The material is then progressed along the car, as it is discharged into the car by the loading boom, by movement of the conveyer in the bottom of the car towards the discharge end thereof. In loading a car in this manner, it is not possible to fully load the car at its discharge end, since head room is limited and the length of the car is considerably greater than twice the length of the loading boom, leaving a space at the discharge end of the car, which cannot be entirely filled, even where an end gate is provided at the discharge end of the car.

The principal objects of my present invention are to provide a novel means cooperating with the conveyer of a shuttle car, so arranged as to permit the car to be fully loaded at its discharge end by the loading boom of a face loading machine when operating in confined places of low head room.

A further object of my invention is to provide a novel and simplified means movable to a position adjacent the receiving end of the car, to permit the piling up of loose material on the conveyer to the top of the car by means of the loading boom of a loading machine, which will hold this material in a piled up condition as it is progressed to the discharge end of the car by the conveyer on the bottom of the car, and will hold this piled up material at the discharge end of the car, as the car moves to discharge its load.

A more specific object of my invention is to provide a movable end gate for a shuttle car, cooperating with and movable along the car with the conveyer during the loading operation, at the speed of travel of the conveyer, so that the loading boom of a loading machine may pile up material against this end gate to the top of the car, and the end gate will move with the conveyer, to cause the conveyer to progressively move this piled up material to the discharge end of the car.

Other objects of my invention will appear from time to time as the following specification proceeds and with reference to the accompanying drawings wherein:

Figure 1 is a view in side elevation of a shuttle car constructed in accordance with my invention;

Figure 2 is an enlarged fragmentary view in side elevation of the discharge end of the car, with certain parts broken away and certain other parts shown in longitudinal section, in order to more clearly illustrate certain details of construction of my invention;

Figure 5 is a transverse sectional view taken through the car and showing the end gate in a closed position;

Figure 6 is an enlarged detail partial fragmentary transverse sectional view, showing certain details of the supporting and guide means for the movable end gate;

Figure 7 is an enlarged detail partial fragmentary longitudinal sectional view, showing certain details of the means for moving the end gate along the car; and Figure 8 is an enlarged partial fragmentary detail transverse sectional view, showing certain details of the drive connection to the means for moving the movable end gate along the car.

Figure 3:
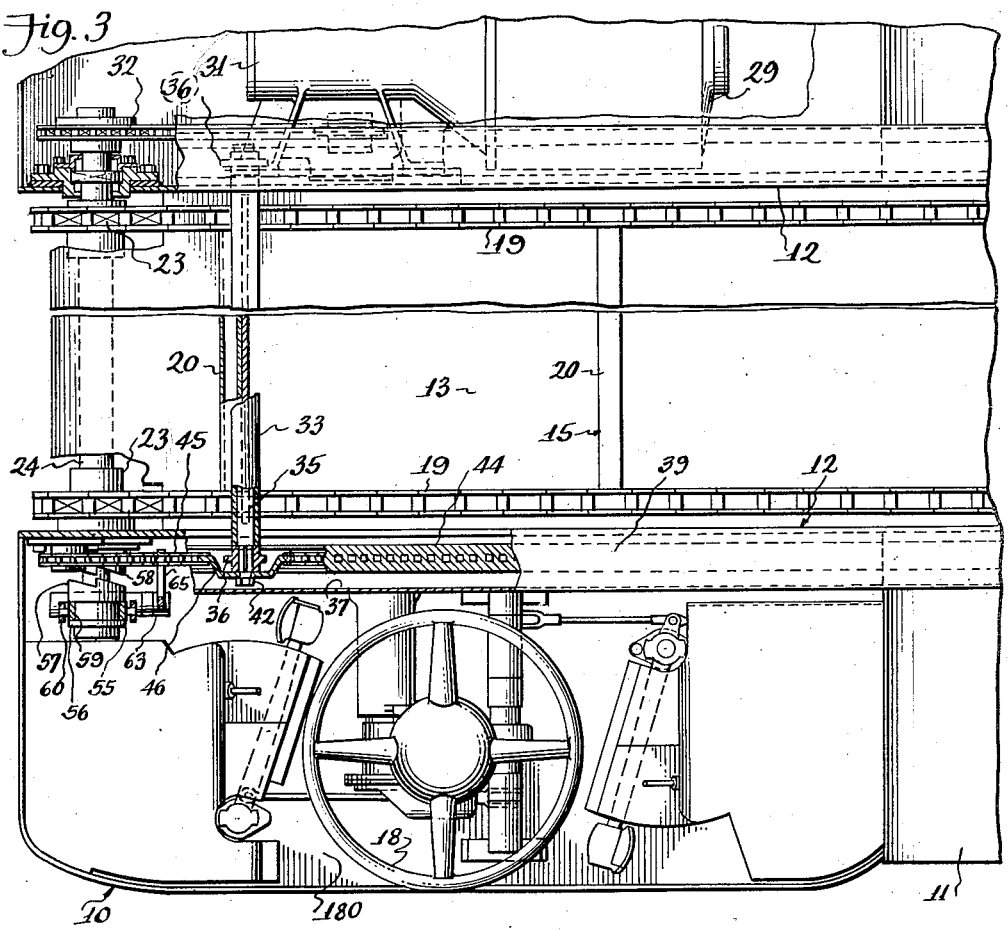
Figure 3 is an enlarged fragmentary plan view of the discharge end of the car, with certain parts broken away and certain other parts shown in horizontal section.

Referring now to the details of the embodiment of my invention illustrated in the drawings, a coal haulage vehicle or shuttle car is indicated generally at 10. Said vehicle consists of an elongated material carrying body 11 including a pair of vertically disposed laterally spaced side walls 12, 12 extending the full length of the vehicle and forming the side walls of a coal carrying compartment indicated at 13. Said side walls are flared outwardly at the receiving end of the car (not shown), to provide a widened material receiving hopper and to facilitate loading by the boom of a loading machine. The bottom of the material carrying compartment of the car is defined by a conveyer indicated generally by reference character 15.

The material carrying body 11 is supported on two rubber tired drive wheels 16, 16 near the rear end of the car, and two rubber tired steering wheels 17, 17 near the front end of the car. Steering is effected by a steering wheel 18 in an operator's compartment 18a near the front end of the car to one side of the conveyer. Said body may be constructed and arranged, and the vehicle may be operated and controlled, in a manner similar to that shown in application Serial No. 456,165, filed by me August 26, 1942, now Patent No. 2,336,386, granted Dec. 7, 1943, so will not herein be shown or described in detail.

The conveyer 15 extends for substantially the full length of the vehicle so that coal can be unloaded mechanically from one end thereof, and is herein shown as being an endless flight conveyer including a pair of parallel spaced endless chains 19, 19 having a plurality of parallel spaced flights 20, 20 mounted therebetween. Said endless chains and flights extend from idlers 21 near the receiving end of the car along a bottom plate 22, connected between the side walls 12, 12 and forming a bottom for the conveyer, to and around drive sprockets 23, 23 on a transverse shaft 24, at the discharge end of the car. said transverse shaft is suitably journaled in depending extensions 25, 25 of the side walls 12, 12. From thence said chains and flights extend along the upper side of a bottom plate 26, forming a bottom for the body of the car, to and around the idlers 21, 21.

The drive shaft 24 and conveyer 15 are suitably driven by an electric motor 29, herein shown as being mounted on the outer side of one of the side walls 12 of the vehicle, opposite from the operator's platform 180. Said drive motor is suitably connected to said drive shaft through a worm and worm gear reduction, in a casing indicated generally at 31, and a chain and sprocket drive 32 driven by the worm gear of said worm and worm gear reduction.

Referring now in particular to the novel means for causing the vehicle to be in a fully loaded condition at its discharge end, when loaded by the loading boom of a loading machine, and for preventing spillage from the discharge end of the vehicle during transportation of the material to a loading station remote from the coal face, a movable end gate 33 is mounted between the side walls 12, 12. Said end gate, as herein shown, is pivotally mounted on a transverse shaft 35, which extends beyond opposite ends thereof and has a sprocket 36 keyed on each of its ends. Said shafts and sprockets extend within recessed compartments 37, 37 formed in the upper sides of and extending along said side walls for a greater part of the length thereof. Said recessed compartments are covered by top cover plates 39, 39, and have an inclined bottom which slopes towards and opens into the conveyer, to permit the discharge of fine material from said recessed compartments and to prevent the clogging of material therein (see Figures 3, 5 and 6). As herein shown, each sprocket rides on its hub on a pair of spaced rails 40, 41 extending along said compartment and supporting the hub of each sprocket on opposite sides of the teeth thereof. Said rails are provided with suitable openings therealong, to permit the discharge of material from said recessed compartments. Nuts 42, 42 are provided on the ends of said shafts to retain said sprockets thereon.

The sprockets 36, 36 each mesh with a rack 44 mounted on the underside of the top cover plate 39, to hold the end gate 33 in perpendicular relation with respect to the side walls 12, 12 during travel of said end gate to the discharge end of the conveyer, so said end gate will not bind between said side walls during its movement therealong.

A flexible drive chain 45 is provided to move the end gate 33 along the body 11. As herein shown, adjacent ends of said drive chain are pivotally connected to opposite ends of a connecting member 46, pivotally mounted on the end of said shaft 35 adjacent the operator's compartment. Said chain extends from said connecting member along the recessed compartment 37 towards the forward end of the vehicle, to and around an idler 47 mounted at the forward end of the vehicle, and downwardly from said idler, to and around a drive sprocket 49, freely mounted on the transverse shaft 24. From said sprocket 49, said chain extends upwardly along a guide shoe 50 to the recessed compartment 37, and rearwardly along said compartment to an idler 51, mounted at the rear end thereof, and forwardly from said idler to the connecting member 46 to which it is connected. Said end gate may thus be moved along said car upon rotation of said drive sprocket 49, in an obvious manner. Said chain 45 is of the same pitch as the conveyer chain 19 and said sprocket 49 is of the same pitch diameter as the sprocket 23, so said end gate will travel along the material carrying compartment 13 at the same rate of speed as the conveyer. A lug 53 projects upwardly from the link of the chain connected to the rear end of the connecting member 46, and is adapted to engage a stop 54, depending from the underside of the top cover 39, to limit rearward movement of said end gate along the side walls 12, 12.

Figure 4:
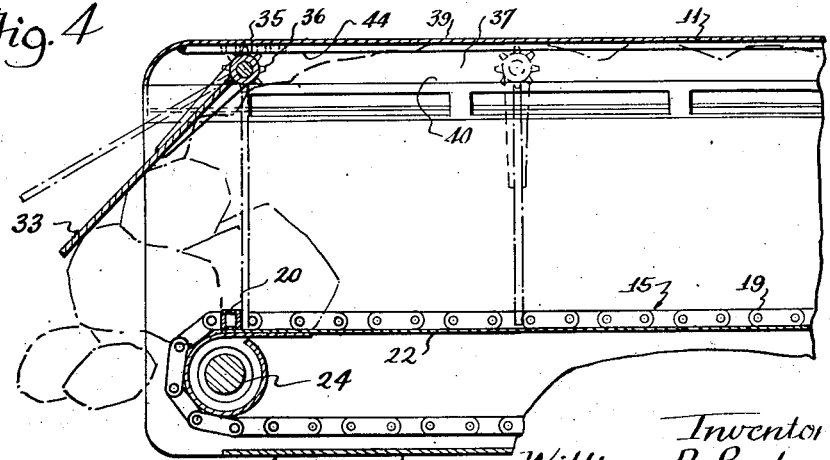
Figure 4 is a partial longitudinal sectional view of the discharge end of the car, with the end gate shown in an open position, to permit material to be discharged from the end of the car.

The end gate 33 has a lower end portion 34 which extends between the conveyer chains 19, 19, beneath the tops of the flights 20, 20 of the conveyer, to a point closely ajacent the bottom plate 26 (see Figure 5). Said lower end is adapted to engage the retreating side of a flight 20 of the conveyer during its travel along the material carrying body of the vehicle, so said conveyer flight will hold said end gate in a closed position. When, however, it is desired to open said end gate at the discharge end of the vehicle, it is only necessary to start the conveyer, to move said flight away from said end gate and let the coal in the vehicle pivot said end gate upwardly and pass between said end gate and conveyer, as is shown in Figure 4.

The drive connection from the transverse drive shaft 24 to the drive sprocket 49 includes a jaw clutch 55. Said clutch includes a clutch member 56 feathered on a lateral extension of said transverse shaft. Said jaw clutch member 56 has spiral jaws 57, 57 formed on its inner face, which are adapted to engage spiral jaws 58, 58 extending outwardly from the drive sprocket 49. Said jaw clutch member is moved along said shaft to engage the jaws 57 with the jaws 58 by means of a clutch collar 59 mounted on said clutch member, and a clutch yoke 60 having pivotal connection with opposite sides of said collar. Said clutch yoke, as herein shown, includes a longitudinally extending shaft 61 pivotally mounted in a bearing support member 62, mounted on and projecting upwardly from the bottom of the operator's compartment 180. A hand lever 63 is mounted on the end of said shaft to operate said clutch yoke and engage the jaws 55 with or disengage said jaws from the jaws 58.

A means is provided to automatically disengage the jaws 57 from the jaws 58 when the end gate 33 reaches the discharge end of the vehicle. Said means, as herein shown, includes a lug 64 projecting from a link of the chain and adapted to engage a dog 65 pivotally mounted on the hand lever 63 and extending inwardly therefrom, to pivot said hand lever and the clutch yoke about the axis of the shaft 61 towards the outer side of the car and disengage the clutch 57, to stop movement of the movable end gate 33. Pivotal movement of said dog with respect to said hand lever is limited by means of two spaced stops 66, 67 projecting from said hand lever on opposite sides of the pivotal axis of said dog. A leaf spring 68 on said dog has engagement with the stop 66 to urge said dog into engagement with the stop 67. Said spring is of sufficient strength that it will normally hold said dog out of engagement with the stop 66 when the clutch is disengaged by said dog, said stop merely serving to limit pivotal movement of said dog, to prevent said lug from passing by said dog, to ascertain that said lug will always be in position to engage said dog at the proper position of the end gate 33 with respect to the material carrying compartment 13.

In operation, when it is desired to start the loading operation, the motor 29 is started in reverse to drive the conveyer 15 towards the receiving end of the car. At the same time, the clutch 55 is engaged to move the end gate 33 along the side walls 12, 12 towards the receiving end of the car, until the stop 53 engages the stop 54. This will throw out said clutch, due to the spiral form of the jaws 57 and 58. The conveyer 15 may continue to be reversely driven until a flight 20 engages the advance edge of the end gate 33, to hold said end gate in a substantially vertical position.

The clutch 55 is then engaged and the motor 29 is reversed to drive the conveyer 15 in a forward direction and cause the end gate to move with the conveyer towards the discharge end of the car. Said conveyer and end gate usually do not move towards the discharge end of the car until material has been piled up against said end gate to the tops of the side walls 12, 12, by the loading boom of a loading machine extending into the body of the vehicle between said side walls.

As the loading operation progresses, material is advanced towards the discharge end of the car by progressive movement of the conveyer 15 towards the discharge end of the car, the end gate 33 moving with said conveyer towards the discharge end of the car, until the lug 64 engages the dog 65, to disengage the clutch 55 and stop movement of said end gate. The motor 29 is then turned off to stop operation of the conveyer 15. The receiving end of the conveyer may then be fully loaded and the car may move towards its discharge station, material being held from spilling from the end thereof during travel of the shuttle car to its discharge station by said movable end gate. When the car reaches its destination, it is unloaded simply by starting the motor 29, to drive the conveyer in a discharge direction, the conveyer flight 20 moving away from said end gate, thus permitting the material in the car to open said end gate and be discharged from the discharge end of the car.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a vehicle for transporting loose material in mines underground, a wheel mounted material carrying frame open at one end and having a pair of laterally spaced side walls forming a material carrying compartment, an endless conveyer forming a bottom for said compartment, and a movable end gate extending from a position adjacent the tops of said side walls to a position adjacent said conveyer and cooperating with said conveyer and movable therewith to the discharge end of said compartment during the loading operation, to cause material to be loaded thereagainst and pile up on the conveyer to fully load said conveyer between said side walls up to said end gate, so the compartment may be fully loaded from the receiving end thereof by movement of the conveyer and end gate towards the discharge end of the vehicle.

2. In a vehicle for transporting loose material in mines underground, a wheel mounted material carrying frame open at one end and having a pair of laterally spaced side walls forming a material carrying compartment, an endless conveyer forming a bottom for said compartment, and a pivoted end gate mounted between said side walls and extending from a position adjacent the tops of said side walls to a position adjacent said conveyer, and movable with the conveyer during the loading operation, to cause material to be loaded thereagainst and pile up on said conveyer against said end gate to cause said conveyer to fully load said vehicle up to said end gate, by the discharge of material in the receiving end thereof, by movement of said conveyer and end gate towards the discharge end of said compartment.

3. In a vehicle for transporting loose material in mines underground, a wheel mounted material carrying frame open at one end and having a pair of laterally spaced side walls forming a material carrying compartment, an endless conveyor forming a bottom for said compartment, and a pivoted end gate for said frame mounted between said side walls adjacent the top sides thereof for movement therealong and extending to and held in a closed position by a flight of said conveyer during movement along said side walls, so said end gate may initially be positioned near the receiving end of said frame and be progressively moved with said conveyer towards the discharge end thereof during the loading operation, to hold material piled thereagainst and permit the conveyer to be fully loaded from its receiving end up to said end gate and to progress a full load of material up to said end gate towards the discharge end of said frame.

4. In a vehicle for transporting loose material in mines underground, a wheel mounted material carrying frame open at one end and having a pair of laterally spaced side walls forming a material carrying compartment, an endless conveyer forming a bottom for said compartment, and an end gate for said frame, pivotally mounted between said side walls adjacent its upper end for movement along said frame with the conveyer and held from pivotal movement to an open position by a flight of said couveyer, and power means for positively moving said end gate along said frame during the loading operation.

5. In a vehicle for transporting loose material in mines underground, a wheel mounted material carrying frame open at one end and having laterally spaced side walls forming a material carrying compartment, an endless conveyer forming a bottom for said compartment, and an end gate for said frame, pivotally mounted between said side walls adjacent its upper end for movement along said frame with the conveyer and held from pivotal movement to an open position by a flight of said conveyer, power means for positively moving said end gate along said frame during the loading operation, and means operable to automatically stop movement of said end gate along said frame, when said end gate reaches the discharge end of said vehicle.

6. In a vehicle for transporting loose material in mines underground, a wheel mounted material carrying frame open at one end and having a pair of laterally spaced side walls forming a material carrying compartment, an endless conveyer forming a bottom for said compartment, an end gate for said frame, said end gate being movable along said frame with the conveyer during the loading operation, and being mounted for pivotal movement about a transverse axis disposed adjacent its upper end, to open about its upper end and permit the discharge of material from said vehicle, and means for holding said end gate from opening during its movement along said frame, and movable with respect to said end gate during the discharge of material from said vehicle, to permit said end gate to open when at the discharge end of said frame for the discharge of material from said frame.

7. In a vehicle for transporting loose material in mines underground, a wheel mounted material carrying frame open at one end and having a pair of laterally spaced side walls forming a material carrying compartment, an endless conveyer forming a bottom for said compartment and having a plurality of parallel spaced flights, an end gate for said frame, said end gate being movable along said frame with the conveyer during the loading operation, and being mounted for pivotal movement about a transverse axis disposed adjacent its upper end, to open about its upper end, to permit the discharge of material from said vehicle, and a flight of said conveyer arranged to hold said end gate from opening during its movement along said frame and to permit said end gate to open by movement of said flight with respect to said end gate.

8. In a vehicle for transporting loose material in mines underground, a wheel mounted material carrying frame open at one end and having a pair of laterally spaced side walls forming a material carrying compartment, an endless conveyer forming a bottom for said compartment, an end gate for said frame movable with said conveyer during the loading operation, and means for moving said end gate along said frame at the speed of travel of said conveyer including a drive chain having connection with said end gate and a drive connection from said conveyer to said chain selectively operable to drive said chain at the speed of said conveyer.

9. In a vehicle for transporting loose material in mines underground, a wheel mounted material carrying frame open at one end and having laterally spaced side walls forming a material carrying compartment, an endless conveyer forming a bottom for said compartment, an end gate for said frame movable with said conveyer during the loading operation, and means for moving said end gate along said frame at the speed of travel of said conveyer including a drive chain having connection with said end gate and a drive connection from said conveyer to said chain, selectively operable to drive said chain at the speed of said conveyer, and means automatically operable to positively disconnect said drive connection from said chain, when said end gate reaches the discharge end of said conveyer.

10. In a vehicle for transporting loose material in mines underground, a wheel mounted material carrying frame open at one end and having laterally spaced side walls forming a material carrying compartment, an endless conveyer forming a bottom for said compartment, an end gate for said frame, movable with said conveyer towards the discharge end of said material carrying compartment during the loading operation, and means for pivotally mounting said end gate between said side walls for movement therealong including a transverse shaft, a pinion on each end of said shaft supported and guided for movement along said side walls, and stationary racks meshing with said pinions, for holding said end gate in substantially perpendicular relation with respect to said side walls during movement therealong.

11. In a vehicle for transporting loose material in mines underground, a wheel mounted material carrying frame open at one end and having laterally spaced side walls forming a material carrying compartment, an endless conveyer forming a bottom for said compartment, an end gate for said frame movable with said conveyer toward the discharge end of said material carrying compartment during the loading operation, and means for pivotally mounting said end gate between said side walls for movement therealong including a transverse shaft, a pinion on each end of said shaft supported and guided for movement along said side walls, stationary racks meshing with said pinions, for holding said end gate in substantially perpendicular relation with respect to said side walls, during movement therealong, and flexible drive means having operative connection with said end gate for moving said end gate along said frame at the speed of said conveyer.

12. In a vehicle for transporting loose material in mines underground, a wheel mounted material carrying frame open at one end and having laterally spaced side walls forming a material carrying compartment, an endless conveyer forming a bottom for said compartment, an end gate for said frame movable with said conveyer during the loading operation, and means for pivotally mounting said end gate between said side walls for movement therealong including a transverse shaft, a pinion on each end of said shaft supported and guided for movement along said side walls, stationary racks meshing with said pinions, for holding said end gate in substantially perpendicular relation with respect to said side walls, during movement therealong, flexible drive means operatively connected with said end gate, and a drive connection from said conveyer to said drive means selectively operable to move said end gate along said side walls at the speed of said conveyer.

13. In a vehicle for transporting loose material in mines underground, a wheel mounted material carrying frame open at one end and having laterally spaced side walls forming a material carrying compartment, an endless conveyer forming a bottom for said compartment, an end gate for said frame movable with said conveyer during the loading operation, and means for pivotally mounting said end gate between said side walls for movement therealong including a transverse shaft, a pinion on each end of said shaft supported and guided for movement along said side walls, stationary racks meshing with said pinions, for holding said end gate in substantially perpendicular relation with respect to said side walls, during movement therealong, flexible drive means having operative connection with said end gate, a drive connection from said conveyer to said drive means, selctively operable to move said end gate along said frame at the speed of said conveyer, including a clutch member, and means operable to automatically disengage said clutch member when said end gate reaches the discharge end of said frame.

WILLIAM R. BECK.